United States Patent
Guo (10) Patent No.: US 12,151,652 B2
(45) Date of Patent: Nov. 26, 2024

(54) CAR ROOF ELECTRIC LIFTING LUGGAGE RACK

(71) Applicant: SHANGHAI CONCORD ELECTRONIC & MACHINERY CO., LTD., Shanghai (CN)

(72) Inventor: Wenxi Guo, Shanghai (CN)

(73) Assignee: SHANGHAI CONCORD ELECTRONIC & MACHINERY CO., LTD., Shanghai (CN)

( * ) Notice: Subject to any disclaimer, the term of this patent is extended or adjusted under 35 U.S.C. 154(b) by 405 days.

(21) Appl. No.: 17/536,080

(22) Filed: Nov. 28, 2021

(65) Prior Publication Data
US 2023/0082917 A1  Mar. 16, 2023

(30) Foreign Application Priority Data
Sep. 13, 2021 (CN) .......................... 202111066728.0

(51) Int. Cl.
*B60R 9/042* (2006.01)

(52) U.S. Cl.
CPC .................................. *B60R 9/042* (2013.01)

(58) Field of Classification Search
CPC ................................ B60R 9/045; B60R 9/042
See application file for complete search history.

(56) References Cited

U.S. PATENT DOCUMENTS

| 6,158,638 | A * | 12/2000 | Szigeti | B60R 9/042 224/310 |
| 8,322,580 | B1 * | 12/2012 | Hamilton | B60R 9/055 224/310 |
| 9,914,400 | B1 * | 3/2018 | Johnsrud | B60R 9/058 |
| 10,189,417 | B1 * | 1/2019 | Morken | B60R 9/042 |
| 2002/0014504 | A1 * | 2/2002 | Hetu | B60R 9/042 224/310 |
| 2006/0280583 | A1 * | 12/2006 | Settelmayer | B60R 9/042 414/462 |
| 2007/0175936 | A1 * | 8/2007 | Goyanko | B60R 9/042 224/309 |
| 2013/0248567 | A1 * | 9/2013 | Townsend | B60R 9/042 224/321 |

(Continued)

FOREIGN PATENT DOCUMENTS

| CN | 113561904 A | * | 10/2021 | ............. B60R 9/042 |
| CN | 215883485 U | * | 2/2022 | ............. B60R 9/042 |
| WO | WO-2017134480 A1 | * | 8/2017 | ............. A47B 88/40 |

*Primary Examiner* — Kaitlin S Joerger
(74) *Attorney, Agent, or Firm* — Jeenam Park (57) ABSTRACT

A car roof electric lifting luggage rack includes bottom brackets, middle supporting sliding brackets, top sliding brackets separately arranged on a left side and a right side of a front fixing handle, a middle fixing bracket, and chain-moving square connecting rods. An upper end of each of the bottom brackets is connected with a first end of a corresponding middle supporting sliding bracket. Each of the top sliding brackets is arranged on an upper end of a corresponding middle supporting sliding bracket. The front fixing handle is connected with inner sides of the top sliding brackets. The middle supporting sliding brackets are separately arranged on a left side and a right side of the middle fixing bracket. The middle fixing bracket is fixedly connected with one end of each of the middle supporting sliding brackets.

7 Claims, 8 Drawing Sheets

(56) References Cited

U.S. PATENT DOCUMENTS

| | | | |
|---|---|---|---|
| 2015/0069101 A1* | 3/2015 | Presley | B60R 9/042 |
| | | | 224/310 |
| 2019/0248295 A1* | 8/2019 | Müller | B60R 9/0423 |
| 2020/0180515 A1* | 6/2020 | Dimmen | A47B 88/45 |
| 2022/0324390 A1* | 10/2022 | Hudswell | B60R 9/042 |
| 2024/0001858 A1* | 1/2024 | Levi | B60R 9/0423 |

* cited by examiner

CAR ROOF ELECTRIC LIFTING LUGGAGE RACK

TECHNICAL FIELD

The present disclosure relates to a field of car luggage bracket technology, and in particular to a car roof electric lifting luggage rack.

BACKGROUND

With continuous improvement of people's living standards, people are more interested in driving and road trip activities. Due to a limited space for storing leisure and vacation items in a luggage compartment of a car, a roof rack assist device is applied to storage large objects such as bicycles and suitcases, which increases storage capacity of the car. However, there are still some problems when the luggage rack is installed on the car.

A current fixed car luggage rack has a simple structure. The tied objects need to be lifted with an aid of auxiliary objects, which is time-consuming and labor-intensive, has low operating efficiency. Further, the current fixed car luggage rack is unable to control a motor to drive the current fixed car luggage rack to achieve internal translation and lifting purposes.

Therefore, it is necessary to provide a car roof electric lifting luggage rack to solve above-mentioned problems.

SUMMARY

An object of the present disclosure is to provide a car roof electric lifting luggage rack to solve problems in the prior art that a current fixed car luggage rack has a simple structure and tied objects need to be lifted with an aid of auxiliary objects, of which is time-consuming and labor-intensive, has low operating efficiency and is unable to control a motor to drive the current fixed car luggage rack to achieve internal translation and lifting purposes.

To achieve the above object, the present disclosure provides a car roof electric lifting luggage rack. The car roof electric lifting luggage rack comprises bottom brackets, middle supporting sliding brackets, top sliding brackets separately arranged on a left side and a right side of a front fixing handle, a middle fixing bracket, and a chain-moving square connecting rod.

An upper end of each of the bottom brackets is connected with a first end of a corresponding middle supporting sliding bracket. Each of the top sliding brackets is arranged on an upper end of a corresponding middle supporting sliding bracket. The front fixing handle is connected with inner sides of the top sliding brackets.

The middle supporting sliding brackets are separately arranged on a left side and a right side of the middle fixing bracket. The middle fixing bracket is fixedly connected with one end of each of the middle supporting sliding brackets. A rear fixing bracket is fixedly connected with another end of each of the middle supporting sliding brackets.

The chain-moving square connecting rod is disposed between the top sliding brackets. An electric device is installed between the middle supporting sliding brackets. A rotating handle device is rotatably connected with one side of one of the top sliding brackets. A safety insurance buckle is mounted on a front side of each of the top sliding brackets.

Optionally, a first end of each of the middle supporting sliding brackets is connected with a corresponding bottom bracket through a respective upper supporting connecting rod. A second end of each of the middle supporting sliding brackets is connected with a corresponding top sliding bracket through a respective lower supporting connecting rod. The structure is convenient to fold the middle supporting sliding brackets, the bottom brackets, and the top sliding brackets to each other, and is convenient to fix the car roof electric lifting luggage rack on the top of the car.

Optionally, a lifting transmission cloth belt passes through a respective middle supporting sliding bracket.

Optionally, mounting bases are symmetrically fixed on two sides of a lower end of each of the bottom brackets. The bottom brackets are mounted on a roof of the car by the mounting bases.

Optionally, a first end of each upper supporting connecting rod is rotatably connected with an inner side of a corresponding bottom bracket. A second end of each upper supporting connecting rod is connected with an inner side of a corresponding middle supporting sliding bracket to form a first rotating structure. Each upper supporting connecting rod controls a rotation angle of the corresponding middle supporting sliding bracket.

Optionally, a first end of each lower supporting connecting rod is rotatably connected with an inner side of a corresponding middle supporting sliding bracket. A second end of each lower supporting connecting rod is connected with an inner side of a lower end of a corresponding top sliding bracket to form a second rotating structure. One side of each of the top sliding brackets is engaged and slidably arranged on the inner side of the corresponding middle supporting sliding bracket. Each lower supporting connecting rod controls a rotation angle of the corresponding top sliding bracket.

Optionally, each of the bottom brackets is connected with a first end of a corresponding traction belt. A second end of each traction belt is connected with a shaft end of a corresponding rotating shaft. Each rotating shaft is fixed to one end of a corresponding top sliding bracket, so it is convenient to drive the device to lift by the traction belts.

Optionally, the bottom brackets are integrated with the electric device, output shafts, synchronous pulleys, and rotating synchronous belts. An upper end and a lower end of each of the rotating synchronous belts are separately connected with a corresponding bottom bracket and a corresponding top sliding bracket. The synchronous pulleys rotate to drive the rotating synchronous belts to rotate, and each of the bottom brackets is linked to a corresponding top sliding bracket to move in opposite directions through connecting clamping plates. A side of the output shafts is fixedly connected with a gear A. A gear B, a gear C, a gear D, and a driving gear are correspondingly arranged on an outside of the gear A. The gear A, the gear B, the C, the gear D, and the driving gear are engaged and connected to form a parallel moving driving module. Through the above arrangement, the device is effectively moved in parallel.

Optionally, a side surface of the rotating handle device is fixedly connected with a sun gear. A ring gear and planetary gears are arranged on an outside of the sun gear. A gear E, a gear F, a gear G, and a transmission wheel are correspondingly arranged on an outside of the ring gear. The gear ring, the gear E, the gear F, the gear G, and the transmission wheel are engaged and connected to form a lifting moving drive module. Through the above arrangement, the device is effectively moved up and down.

Compared with the prior art, The car roof electric lifting luggage rack adopts a new structural design, so that the device conveniently controls a corresponding rotation of the middle supporting sliding brackets and the top sliding brackets. The middle supporting sliding brackets are tilted on one side of the bottom brackets, and the top sliding brackets are horizontally arranged on the outside of the middle supporting sliding brackets. At this time, the car roof electric lifting luggage rack moves down as a whole, which is convenient for fixing large objects on the car roof electric lifting luggage rack, thereby facilitating large luggage items to be fixed to a roof of a car, which is convenient to operate and saves energy.

In the drawings:
1—bottom bracket; 2—middle supporting sliding bracket; 201—rotating shaft; 202—traction belt; 3—top sliding bracket; 4—front fixing handle; 5—middle fixing bracket; 6 rear fixing bracket; 7—chain-moving square connecting rod; 8—electric device; 801—output shaft; 802—synchronous pulley; 803—rotating synchronous belt; 804—connecting clamping plates; 805—gear A; 806—gear B; 807—gear C; 808—gear D; 809—driving gear; 9—rotating handle device; 901—sun gear; 902—ring gear; 903—planetary gear; 904—gear E; 905—gear F; 906—gear G; 907—transmission wheel; 10—safety insurance buckle; 11—upper supporting connecting rod; 12—lower supporting connecting rod; 13—lifting transmission cloth belt; 15—mounting base.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

As shown in FIGS. 1-11, the present disclosure provides a car roof electric lifting luggage rack. The car roof electric lifting luggage rack comprises bottom brackets 1, middle supporting sliding brackets 2, top sliding brackets 3 separately arranged on a left side and a right side of a front fixing handle 4, a middle fixing bracket 5, and a chain-moving square connecting rod 7.

Figure 1:
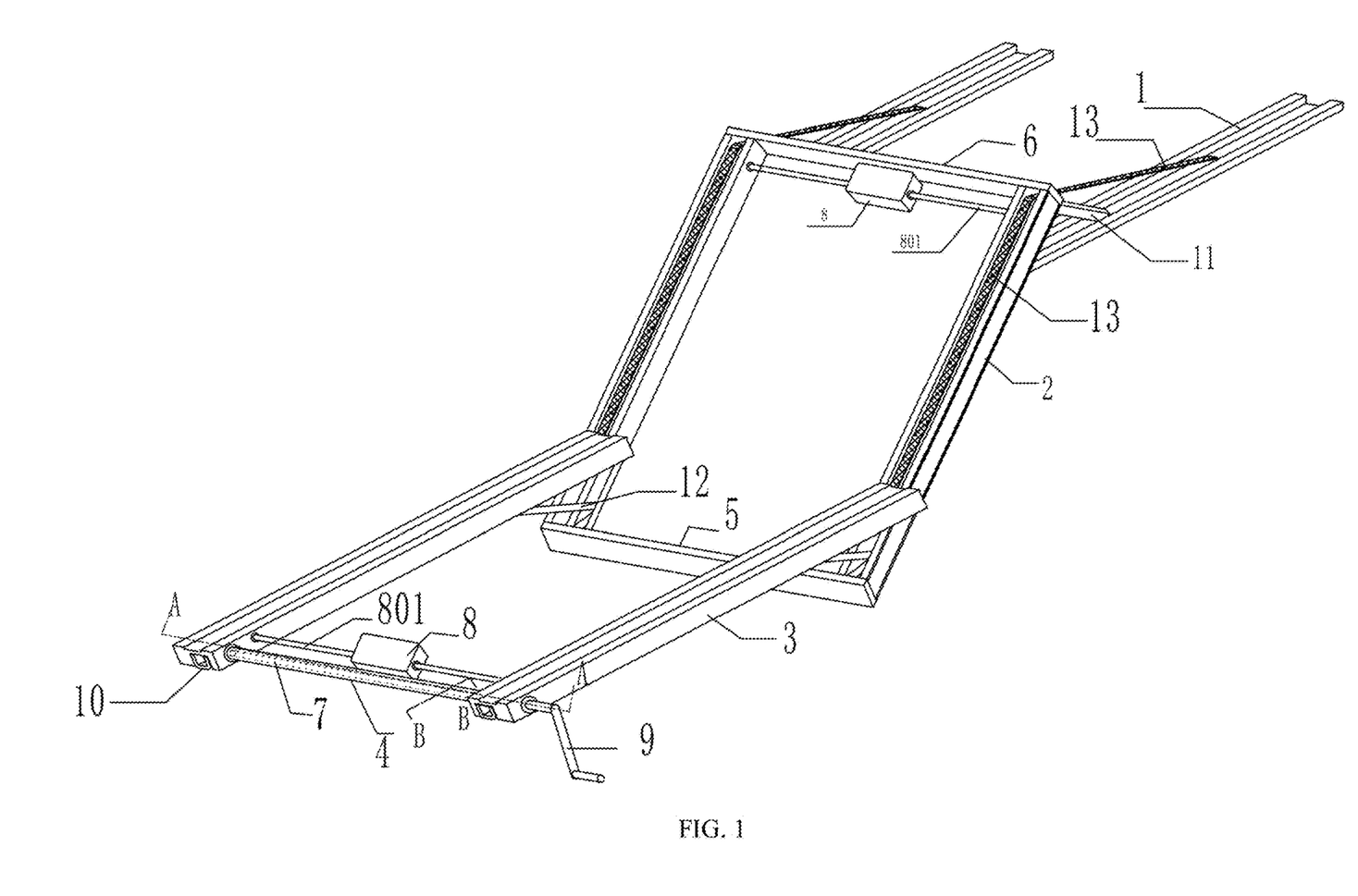
FIG. 1 is a perspective view of a car roof electric lifting luggage rack of the present disclosure.

An upper end of each of the bottom brackets 1 is connected with a first end of a corresponding middle supporting sliding bracket 2. Each of the top sliding brackets 3 is arranged on an upper end of a corresponding middle supporting sliding bracket 2. The front fixing handle 4 is connected with inner sides of the top sliding brackets 3.

The middle supporting sliding brackets 2 are separately arranged on a left side and a right side of the middle fixing bracket 5. The middle fixing bracket 5 is fixedly connected with one end of each of the middle supporting sliding brackets 2. A rear fixing bracket 6 is fixedly connected with another end of each of the middle supporting sliding brackets 2.

The chain-moving square connecting rod 7 is mounted between the top sliding brackets 3. An electric device 8 is installed between the middle supporting brackets 2. A rotating handle device 9 is rotatably connected with one side of one of the top sliding brackets 3. A safety insurance buckle 10 is mounted on a front side of each of the top sliding brackets 3.

A first end of each of the middle supporting sliding brackets 2 is connected with a corresponding bottom bracket 1 through a respective upper supporting connecting rod 11. A second end of each of the middle supporting sliding brackets 2 is connected with a corresponding top sliding bracket 3 through a respective lower supporting connecting rod 12.

Figure 2:
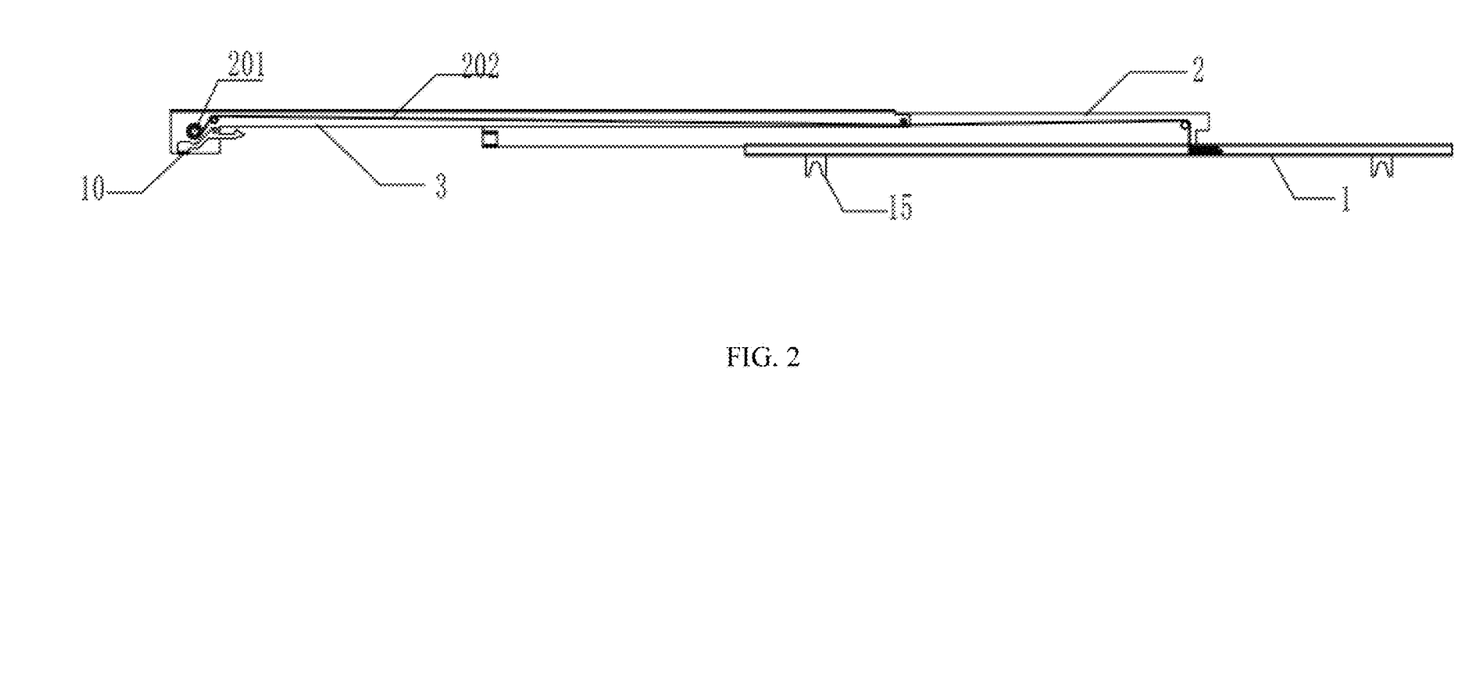
FIG. 2 is a schematic diagram showing a connecting structure of a rotating shaft and a traction belt of the present disclosure.
Figure 3:
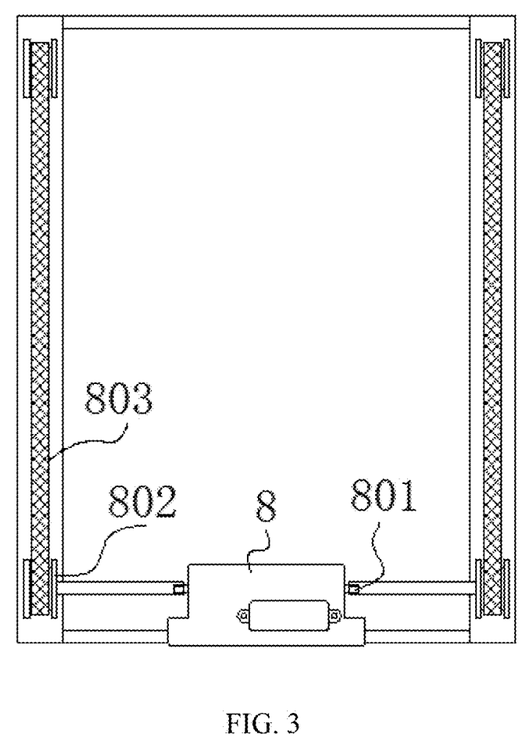
FIG. 3 is a schematic diagram showing a connecting structure of output shafts and synchronous pulleys of the present disclosure.

The middle supporting sliding brackets 2 and the top sliding brackets 3 are controlled to expand obliquely to a side of a car through the rotating handle device 9 or the electric device 8. The electric device 8 transmits signal commands through a remote control. A circuit board controls a gear assembly arranged inside a motor to rotate to drive the output shafts 801 to rotate. Each of the output shafts 801 is connected with a corresponding rotating shaft 201 arranged on a corresponding top sliding bracket 3. Each of the output shafts 801 is linked with the corresponding rotating shaft 201 to realize lifting of the car roof electric lifting luggage rack. Large luggage items are placed on the top sliding brackets 3, which is convenient to operate and saves time and effort, Each upper supporting connecting rod 11 and each lower supporting connecting rod 12 rotate correspondingly to reinforce an overall strength of the unfolded car roof electric lifting luggage rack and improve an effect of the car roof electric lifting luggage rack in carrying large luggage items.

A lifting transmission cloth belt 13 passes through a respective middle supporting sliding bracket 2.

Mounting bases 15 are symmetrically fixed on two sides of a lower end of each of the bottom brackets 1. The bottom brackets 1 are mounted on a roof of the car by the mounting bases 15.

A first end of each upper supporting connecting rod 11 is rotatably connected with an inner side of a corresponding bottom bracket 1. A second end of each upper supporting connecting rod 11 is connected with an inner side of a corresponding middle supporting sliding bracket 2 to form a first rotating structure.

A first end of each lower supporting connecting rod 12 is rotatably connected with an inner side of a corresponding middle supporting sliding bracket 2. A second end of each lower supporting connecting rod 12 is connected with an inner side of a lower end of a corresponding top sliding bracket 3 to form a second rotating structure. One side of each of the top sliding brackets 3 is engaged and slidably arranged on the inner side of the corresponding middle supporting sliding bracket 2.

Each lifting transmission cloth belt 13 comprises a traction belt 202 and a rotating shaft 201. Each of the bottom brackets 1 is connected with a first end of a corresponding traction belt 202. A second end of each traction belt 202 is connected with a shaft end of a corresponding rotating shaft 201. Each rotating shaft 201 is fixed to one end of a corresponding top sliding bracket 3. Each rotating shaft is plugged into the chain-moving square connecting rod 7 for fixing.

The bottom brackets 1 are integrated with the electric device 8, output shafts 801, synchronous pulleys 802, and rotating synchronous belts 803. An upper end and a lower end of each of the rotating synchronous belts 803 are separately connected with a corresponding bottom bracket 1 and a corresponding top sliding bracket 3. The synchronous pulleys 802 rotate to drive the rotating synchronous belts 803 to rotate, and each of the bottom brackets 1 is linked to a corresponding top sliding bracket 3 to move in opposite directions through connecting clamping plates 804. A side of the output shafts is fixedly connected with a gear A 805. A gear B 806, a gear C 807, a gear D 808, and a driving gear 809 are correspondingly arranged on an outside of the gear A 805. The gear A 805, the gear B 806, the C 807, the gear D 808, and the driving gear 809 are engaged and connected to form a parallel moving driving module.

Figure 7:
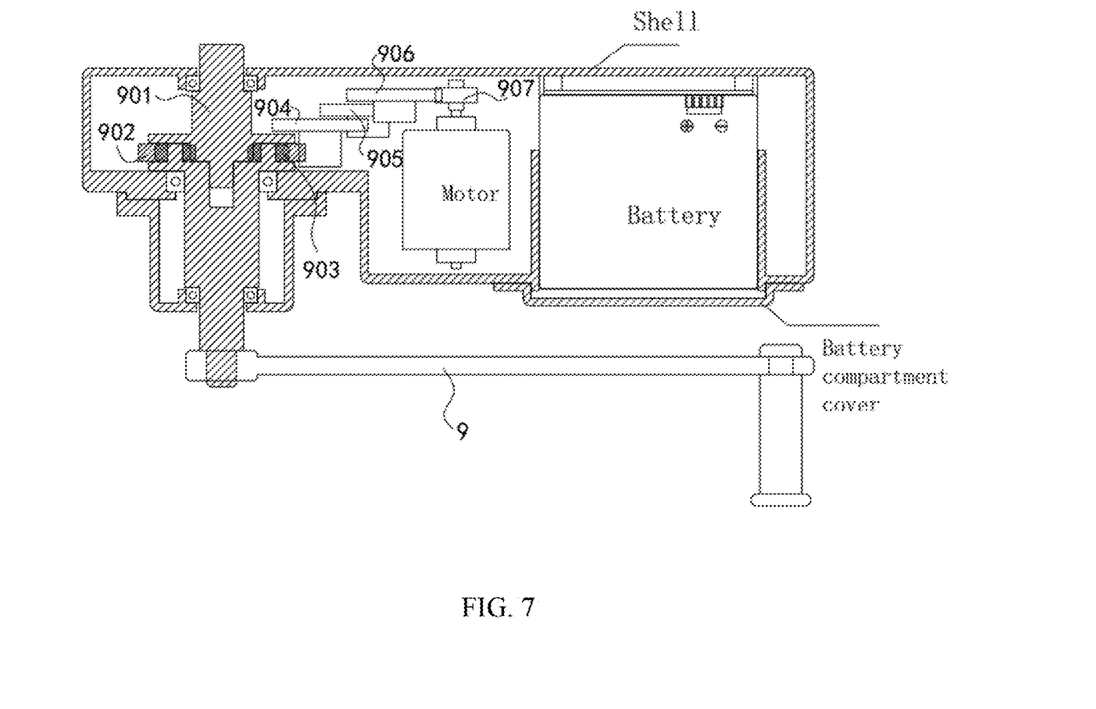
FIG. 7 is a schematic diagram of a rotating handle device of the present disclosure.
Figure 8:
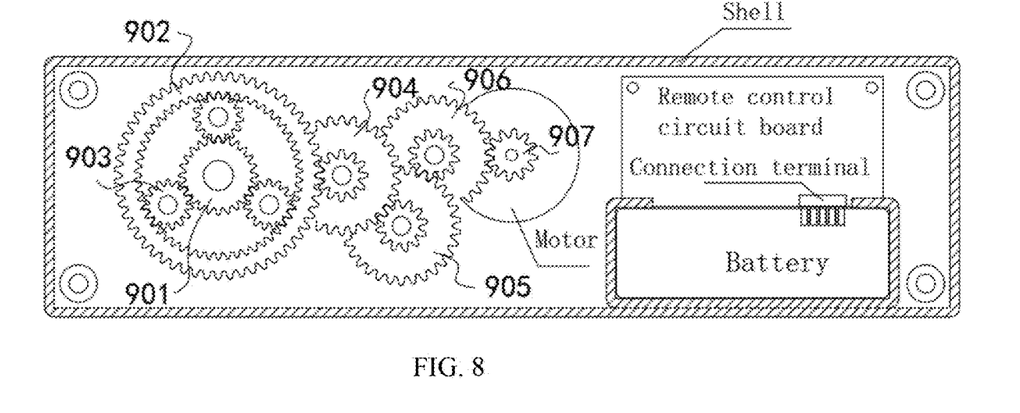
FIG. 8 is a schematic diagram of a sun gear of the present disclosure.
Figure 9:
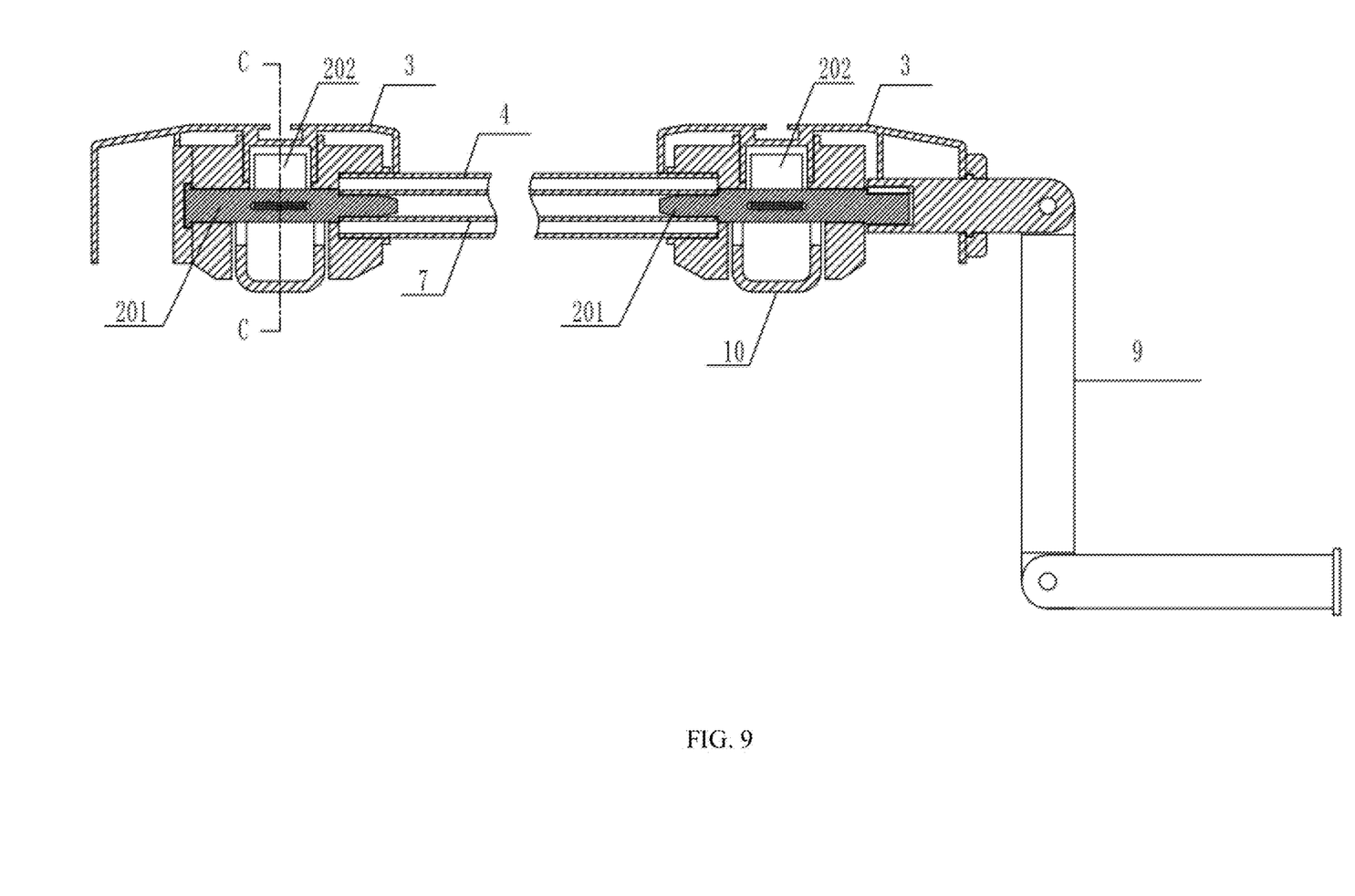
FIG. 9 is a cross-sectional schematic diagram taken along the line A-A shown in FIG. 1.
Figure 10:
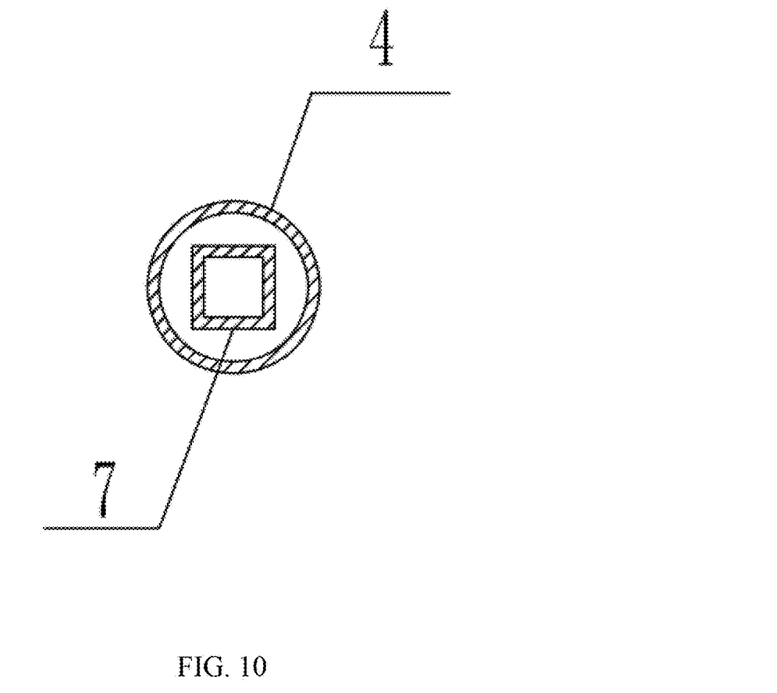
FIG. 10 is a cross-sectional schematic diagram taken along the line B-B shown in FIG. 1.
Figure 11:
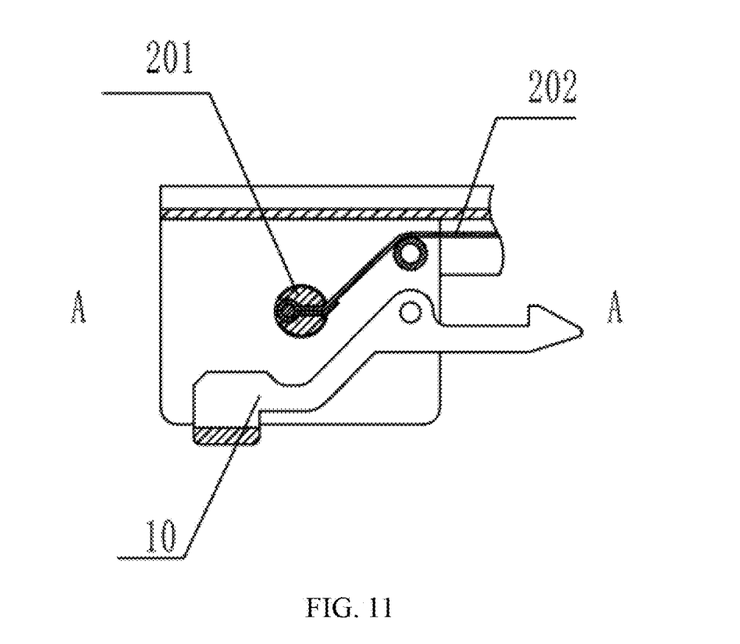
FIG. 11 is a cross-sectional schematic diagram taken along the line C-C shown in FIG. 9.

A side surface of the rotating handle device 9 is fixedly connected with a sun gear 901. A ring gear 902 and planetary gears 903 are arranged on an outside of the sun gear 901. A gear E 904, a gear F 805, a gear G 906, and a transmission wheel 907 are correspondingly arranged on an outside of the ring gear. The gear ring 902, the gear E 904, the gear F 905, the gear G 906, and the transmission wheel 907 are engaged and connected to form a lifting moving drive module.

Figure 4:
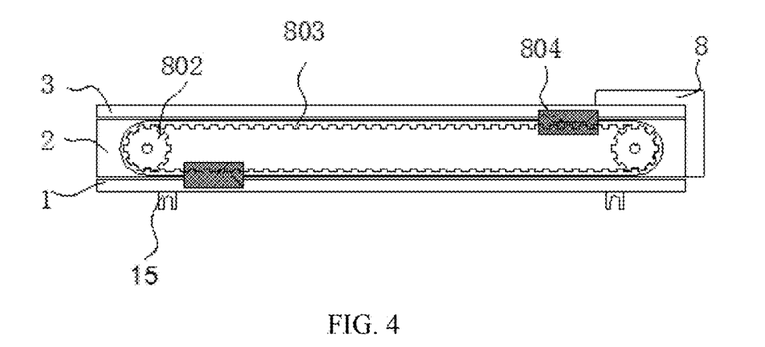
FIG. 4 is a schematic diagram showing a structure of a rotating synchronous belt of the present disclosure.
Figure 5:
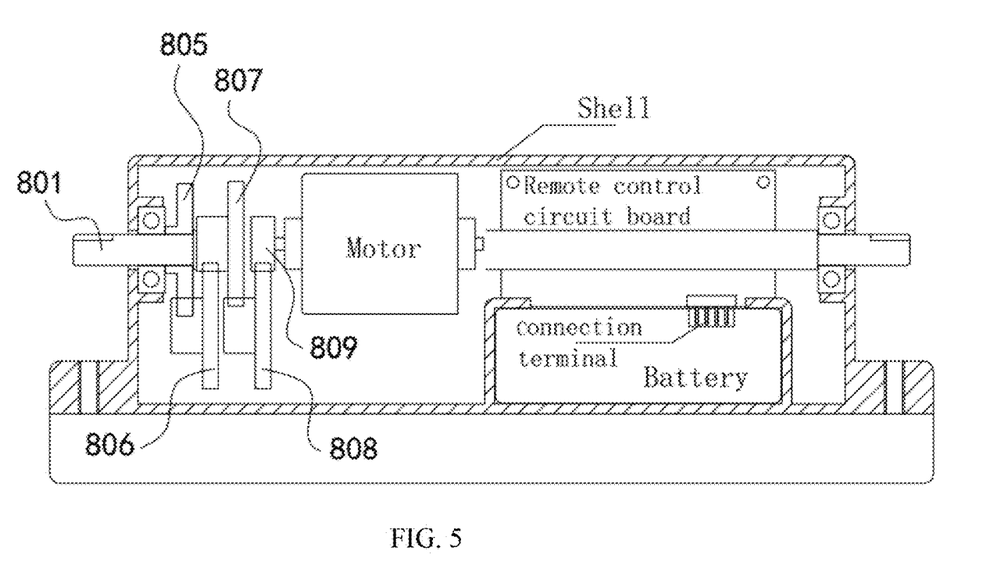
FIG. 5 is a schematic diagram of a driving mechanism of the present disclosure.
Figure 6:
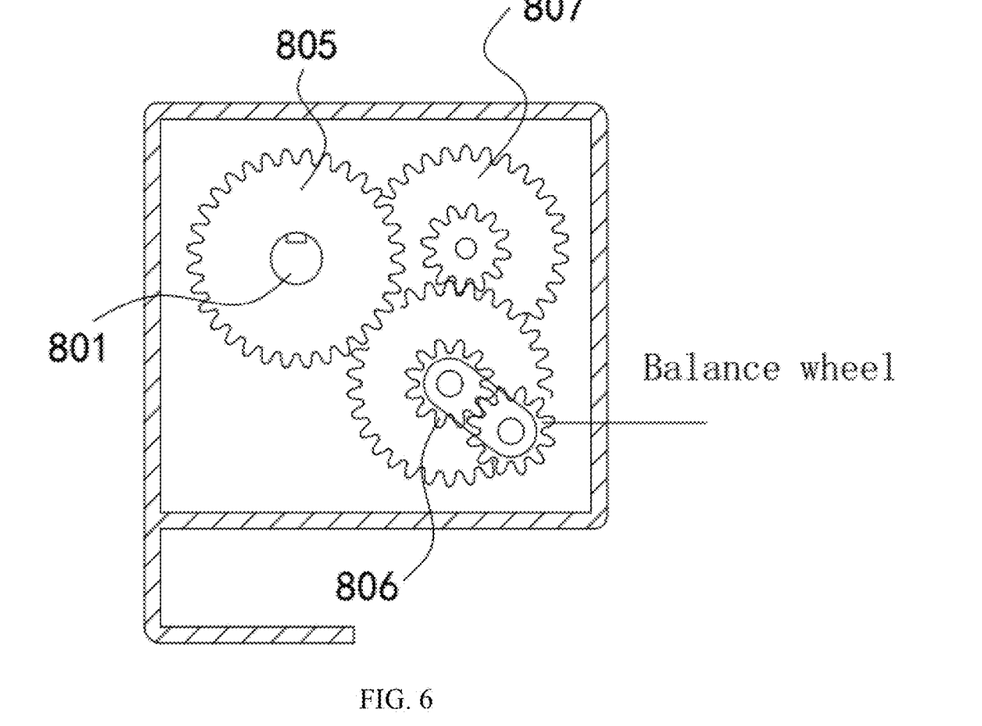
FIG. 6 is a schematic diagram of a gear assembly of the present disclosure.

The bottom brackets 1 are centrally installed on a roof of the car through the mounting bases 15. When in a closed state: the top sliding brackets 3, the middle supporting sliding brackets 2, and the bottom brackets 1 are stacked in sequence with each other and are stored on the roof of the car. When fixing the large luggage items (such as a bike) to the roof of the car, each safety insurance buckle 10 is firstly opened, then the middle supporting sliding brackets 2 slide to a front side to adjust a position of the middle supporting sliding brackets 2, and then the top sliding brackets 3 are controlled to slide down through the electric device 8 or the rotating handle device 9. The electric device 8 transmits signal commands through the remote control. The circuit board controls the gear assembly arranged inside the motor to rotate. Each of the output shafts 801 is concentrically connected with corresponding synchronous pulleys 802, thereby linking rotation of the rotating synchronous belts 803 to move. When the rotation of the rotating synchronous belts 803 stops in place, a current is generated to blocked lifting of the car roof electric lifting luggage rack: the circuit board detects a current change index and controls the motor to stop working to complete the electric parallel movement of the car roof electric lifting luggage rack. The top sliding brackets 3 are horizontally arranged under the middle supporting sliding brackets 2. The rotating handle device 9 is rotated or the electric device 8 is turned on to push the top sliding brackets 3 and the middle supporting sliding brackets 2 to stack on upper ends of the bottom brackets 1, which is convenient to operate and saves time and effort.

A working principle of using the car roof electric lifting luggage rack is as follow:

When using the car roof electric lifting luggage rack, the middle supporting sliding brackets 2 and the top sliding brackets 3 are controlled to expand obliquely to a side of a car through the rotating handle device 9 or the electric device 8. The electric device 8 transmits signal commands through a remote control. A circuit board controls a gear assembly arranged inside a motor to rotate to drive the output shafts 801 to rotate. Each of the output shafts 801 is concentrically connected with a corresponding rotating shaft 201 arranged on a corresponding top sliding bracket 3. Each of the output shafts 801 is linked with the corresponding rotating shaft 201 to realize lifting of the car roof electric lifting luggage rack. Large luggage items are placed on the top sliding brackets 3, which is convenient to operate and saves time and effort, Each upper supporting connecting rod 11 and each lower supporting connecting rod 12 rotate correspondingly to reinforce an overall strength of the unfolded car roof electric lifting luggage rack and improve an effect of the car roof electric lifting luggage rack in carrying large luggage items.

The bottom brackets 1 are centrally installed on a roof of the car through the mounting bases 15. When in a closed state; the top sliding brackets 3, the middle supporting sliding brackets 2, and the bottom brackets 1 are stacked in sequence with each other and are stored on the roof of the car. When fixing the large luggage items (such as a bike) to the roof of the car, each safety insurance buckle 10 is firstly opened, then the middle supporting sliding brackets 2 slide to a front side to adjust a position of the middle supporting sliding brackets 2, and then the top sliding brackets 3 are controlled to slide down through the electric device 8 or the rotating handle device 9. The electric device 8 transmits signal commands through the remote control. The circuit board controls the gear assembly arranged inside the motor to rotate. Each of the output shafts 801 is concentrically connected with corresponding synchronous pulleys 802, thereby linking rotation of the rotating synchronous belts 803 to move. When the rotation of the rotating synchronous belts 803 stops in place, a current is generated to blocked lifting of the car roof electric lifting luggage rack: the circuit board detects a current change index and controls the motor to stop working to complete the electric parallel movement of the car roof electric lifting luggage rack. The top sliding brackets 3 are horizontally arranged under the middle supporting sliding brackets 2. The rotating handle device 9 is rotated or the electric device 8 is turned on to push the top sliding brackets 3 and the middle supporting sliding brackets 2 to stack on upper ends of the bottom brackets 1, which is convenient to operate and saves time and effort.

Although the embodiments of the present disclosure have been shown and described, those of ordinary skill in the art can understand that various changes, modifications, substitutions, and variations can be made to these embodiments without departing from the principle and spirit of the present disclosure. The scope of the present disclosure is defined by the appended claims and their equivalents.

What is claimed is:

1. A car roof electric lifting luggage rack, comprising:
bottom brackets;
middle supporting sliding brackets;
top sliding brackets separately arranged on a left side and a right side of a front fixing handle;
a middle fixing bracket; and
a chain-moving square connecting rod;

wherein an upper end of each of the bottom brackets is connected with a first end of a corresponding middle supporting sliding bracket; each of the top sliding brackets is arranged on an upper end of a corresponding middle supporting sliding bracket; the front fixing handle is connected with inner sides of the top sliding brackets;

wherein the middle supporting sliding brackets are separately arranged on a left side and a right side of the middle fixing bracket; the middle fixing bracket is fixedly connected with one end of each of the middle supporting sliding brackets;

wherein the chain-moving square connecting rod is connected between the top sliding brackets; an electric device is installed between the middle supporting sliding brackets; a rotating handle device is rotatably connected with one side of one of the top sliding brackets; a safety insurance buckle is mounted on a front side of each of the top sliding brackets;

wherein the first end of each of the middle supporting sliding brackets is connected with a corresponding bottom bracket through a respective upper supporting connecting rod, a second end of each of the middle supporting sliding brackets is connected with a corresponding top sliding bracket through a respective lower supporting connecting rod;

wherein a lifting transmission cloth belt passes through a respective middle supporting sliding bracket;

wherein mounting bases are symmetrically fixed on two sides of a lower end of each of the bottom brackets; the bottom brackets are mounted on a roof of the car by the mounting bases.

2. The car roof electric lifting luggage rack according to claim 1, wherein a first end of each upper supporting connecting rod is rotatably connected with an inner side of a corresponding bottom bracket; a second end of each upper supporting connecting rod is connected with an inner side of a corresponding middle supporting sliding bracket to form a first rotating structure.

3. The car roof electric lifting luggage rack according to claim 1, wherein a first end of each lower supporting connecting rod is rotatably connected with an inner side of a corresponding middle supporting sliding bracket; a second end of each lower supporting connecting rod is connected with an inner side of a lower end of a corresponding top sliding bracket to form a second rotating structure; one side of each of the top sliding brackets is engaged and slidably arranged on the inner side of the corresponding middle supporting sliding bracket.

4. The car roof electric lifting luggage rack according to claim 1, wherein each of the lifting transmission cloth belts comprises a traction bel and a rotating shaft; each of the bottom brackets is connected with a first end of a corresponding traction belt; a second end of each traction belt is connected with a shaft end of a corresponding rotating shaft; each rotating shaft is fixed to one end of a corresponding top sliding brackets.

5. The car roof electric lifting luggage rack according to claim 1, wherein the bottom brackets are integrated with the electric device, output shafts, synchronous pulleys, and rotating synchronous belts; an upper end and a lower end of each of the rotating synchronous belts are separately connected with a corresponding bottom bracket and a corresponding top sliding bracket; the synchronous pulleys rotate to drive the rotating synchronous belts to rotate, and each of the bottom brackets is linked to a corresponding top sliding bracket to move in opposite directions through connecting clamping plates; a side of the output shafts is fixedly connected with a gear A; a gear B, a gear C, a gear D and a driving gear are correspondingly arranged on an outside of the gear A; the gear A, the gear B, the C, the gear D, and the driving gear are engaged and connected to form a parallel moving driving module.

6. The car roof electric lifting luggage rack according to claim 1, wherein a side surface of the rotating handle device is fixedly connected with a sun gear, a ring gear and planetary gears are arranged on an outside of the sun gear; a gear E, a gear F, a gear G and a transmission wheel are correspondingly arranged on an outside of the ring gear; the gear ring, the gear E, the gear F, the gear G, and the transmission wheel are engaged and connected to form a lifting moving drive module.

7. The car roof electric lifting luggage rack according to claim 1, wherein a method of using the car roof electric lifting luggage rack is as follow:

when using the car roof electric lifting luggage rack, the middle supporting sliding brackets and the top sliding brackets are controlled to expand obliquely to a side of a car through the rotating handle device or the electric device; the electric device transmits signal commands through a remote control; a circuit board controls a gear assembly arranged inside a motor to rotate to drive the output shafts to rotate; each of the output shafts is connected with a corresponding rotating shaft arranged on a corresponding top sliding bracket; each of the output shafts is linked with the corresponding rotating shaft to realize lifting of the car roof electric lifting luggage rack; large luggage items are placed on the top sliding brackets; each upper supporting connecting rod and each lower supporting connecting rod rotate correspondingly to reinforce an overall strength of the unfolded car roof electric lifting luggage rack;

wherein the bottom brackets are centrally installed on a roof of the car through the mounting bases; when in a closed state; the top sliding brackets, the middle supporting sliding brackets and the bottom brackets are stacked in sequence with each other and are stored on the roof of the car; when fixing the large luggage items to the roof of the car, each safety insurance buckle is firstly opened, then the middle supporting sliding brackets slide to a front side to adjust a position of the middle supporting sliding brackets, and then the top sliding brackets are controlled to slide down through the electric device or the rotating handle device; the electric device transmits signal commands through the remote control; the circuit board controls the gear assembly arranged inside the motor to rotate; each of the output shafts is concentrically connected with corresponding synchronous pulleys, thereby linking rotation of the rotating synchronous belts to move; when the rotation of the rotating synchronous belts stops in place, a current is generated to blocked lifting of the car roof electric lifting luggage rack; the circuit board detects a current change index and controls the motor to stop working to complete the electric parallel movement of the car roof electric lifting luggage rack; the top sliding brackets are horizontally arranged under the middle supporting sliding brackets; the rotating handle device is rotated or the electric device is turned on to push the top sliding brackets and the middle supporting sliding brackets to stack on upper ends of the bottom brackets.

* * * * *